(12) United States Patent
Ino

(10) Patent No.: US 11,146,732 B2
(45) Date of Patent: Oct. 12, 2021

(54) CONTROL APPARATUS, LENS APPARATUS, IMAGE PICKUP APPARATUS, AND IMAGE PICKUP SYSTEM

(71) Applicant: CANON KABUSHIKI KAISHA, Tokyo (JP)

(72) Inventor: Tomohiro Ino, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/120,727

(22) Filed: Dec. 14, 2020

(65) Prior Publication Data

US 2021/0195110 A1 Jun. 24, 2021

(30) Foreign Application Priority Data

Dec. 18, 2019 (JP) .............................. JP2019-227871

(51) Int. Cl.
   *H04N 5/232* (2006.01)
(52) U.S. Cl.
   CPC ..... *H04N 5/23287* (2013.01); *H04N 5/23212* (2013.01)
(58) Field of Classification Search
   CPC ........................ H04N 5/23287; H04N 5/23212
   See application file for complete search history.

(56) References Cited

U.S. PATENT DOCUMENTS

| | | | |
|---|---|---|---|
| 9,838,605 B2 | 12/2017 | Tsuchiya | |
| 9,930,259 B2 | 3/2018 | Koyano | |
| 2016/0330378 A1 | 11/2016 | Tsuchiya | |
| 2017/0019600 A1 | 1/2017 | Koyano | |
| 2019/0199912 A1* | 6/2019 | Nagano | H04N 5/23293 |
| 2019/0230287 A1* | 7/2019 | Shingu | H04N 5/23258 |
| 2019/0289216 A1 | 9/2019 | Ito | |
| 2019/0387170 A1* | 12/2019 | Takayanagi | H04N 5/23296 |
| 2020/0036899 A1 | 1/2020 | Tanaka | |
| 2020/0288062 A1* | 9/2020 | Kojima | H04N 5/23258 |

FOREIGN PATENT DOCUMENTS

| | | |
|---|---|---|
| JP | 21010091792 A | 4/2010 |
| JP | 2017021253 A | 1/2017 |
| JP | 6410431 B2 | 10/2018 |
| WO | 2018186176 A1 | 10/2018 |

OTHER PUBLICATIONS

Extended European Search Report issued in European Appln. No. 20214290.7 dated May 31, 2021.

* cited by examiner

*Primary Examiner* — Shahbaz Nazrul
(74) *Attorney, Agent, or Firm* — Rossi, Kims & McDowell LLP

(57) ABSTRACT

A control apparatus configured to control at least one of a first driver that drives an image sensor for a first image stabilization and a second driver that drives a lens for a second image stabilization includes at least one processor or circuit configured to execute a plurality of tasks including a determination task configured to determine a ratio between the first image stabilization by the first driver and the second image stabilization by the second driver, using information on a changing amount of an imageable area of an optical system including the lens relative to a unit correcting angle of the second image stabilization, and information on a correcting angle of the first image stabilization relative to a unit driving amount of the image sensor.

11 Claims, 4 Drawing Sheets

CONTROL APPARATUS, LENS APPARATUS, IMAGE PICKUP APPARATUS, AND IMAGE PICKUP SYSTEM

BACKGROUND OF THE INVENTION

Field of the Invention

The present invention relates to a control apparatus, a lens apparatus, an image pickup apparatus, and an image pickup system.

Description of the Related Art

Image pickup apparatuses have recently been proposed which perform a hybrid image stabilization that combines an image-sensor image stabilization that provides an image stabilization by shifting an image sensor and an inter-lens image stabilization that provides an image stabilization by shifting a partial lens unit in an imaging optical system relative to an optical axis of the imaging optical system.

Japanese Patent No. ("JP") 6410431 discloses a camera system that expands an image stabilization range for the entire camera system by properly setting an image stabilization ratio between the image sensor and the lens unit.

However, the camera system of JP 6410431 determines the correction ratio based on correcting ranges of the image sensor and the lens unit, and thus light is shielded in an image when either of the correction amounts is set to be maximum.

SUMMARY OF THE INVENTION

The present invention provides a control apparatus, a lens apparatus, an image pickup apparatus, and an image pickup system, each of which can properly perform an image stabilization and obtain a good image.

A control apparatus according to one aspect of the present invention configured to control at least one of a first driver that drives an image sensor for a first image stabilization and a second driver that drives a lens for a second image stabilization includes at least one processor or circuit configured to execute a plurality of tasks including a determination task configured to determine a ratio between the first image stabilization by the first driver and the second image stabilization by the second driver, using information on a changing amount of an imageable area of an optical system including the lens relative to a unit correcting angle of the second image stabilization, and information on a correcting angle of the first image stabilization relative to a unit driving amount of the image sensor.

A lens apparatus according to another aspect of the present invention attachable to and detachable from an image pickup apparatus that includes a camera-side driver configured to drive an image sensor for an image stabilization includes an optical system including a lens, a lens-side driver configured to drive the lens for an image stabilization, and at least one processor or circuit configured to execute a plurality of tasks including a determination task configured to determine a ratio between the image stabilization by the lens-side driver and the image stabilization by the camera-side driver, using information on a changing amount of an imageable area of the optical system relative to a unit correcting angle of the image stabilization using the lens, and information on a correcting angle of the image stabilization using the image sensor relative to a unit driving amount of the image sensor.

An image pickup apparatus according to another aspect of the present invention attachable to and detachable from a lens apparatus that includes a lens-side driver configured to drive a lens for an image stabilization includes a camera-side driver configured to drive an image sensor for an image stabilization, and at least one processor or circuit configured to execute a plurality of tasks including a determination task configured to determine a ratio between the image stabilization by the lens-side driver and the image stabilization by the camera-side driver, using information on a changing amount of an imageable area of an optical system including the lens, relative to a unit correcting angle of the image stabilization using the lens, and information on a correcting angle of the image stabilization using the image sensor relative to a unit driving amount of the image sensor.

An image pickup system according to another aspect of the present invention includes the above lens apparatus, and an image pickup apparatus attachable to and detachable from a lens apparatus that includes a lens-side driver configured to drive a lens for an image stabilization. The image pickup apparatus includes a camera-side driver configured to drive an image sensor for an image stabilization, and at least one processor or circuit configured to execute a plurality of tasks including a determination task configured to determine a ratio between the image stabilization by the lens-side driver and the image stabilization by the camera-side driver, using information on a changing amount of an imageable area of an optical system including the lens, relative to a unit correcting angle of the image stabilization using the lens, and information on a correcting angle of the image stabilization using the image sensor relative to a unit driving amount of the image sensor.

Further features of the present invention will become apparent from the following description of exemplary embodiments with reference to the attached drawings.

DESCRIPTION OF THE EMBODIMENTS

Figure 1:
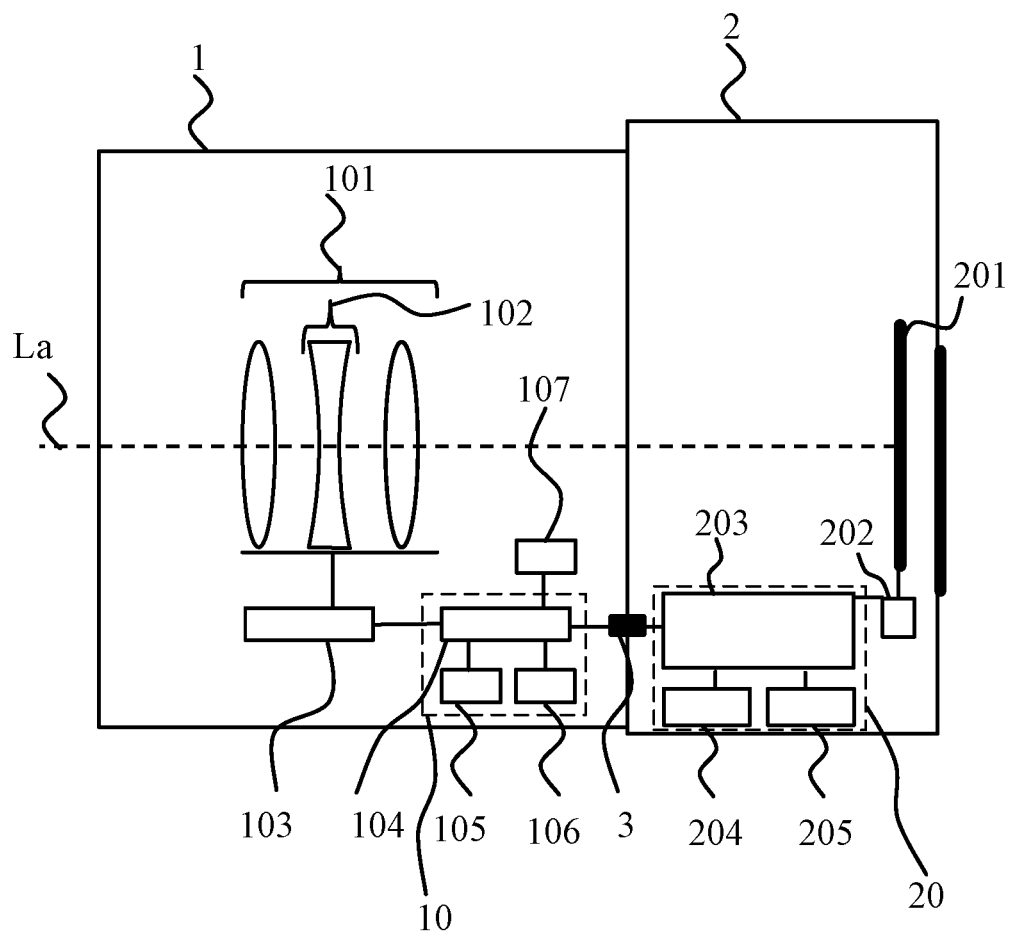
FIG. 1 is a configuration diagram of a digital camera which is an illustrative camera system according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

First Embodiment

FIG. 1 is a configuration diagram of a digital camera which is an illustrative camera system (image pickup system) according to one embodiment of the present invention. The digital camera is a lens interchangeable type camera, and has a lens unit (lens apparatus) 1 and a camera body (image pickup apparatus) 2. The lens unit 1 is attachable to and detachable from the camera body 2. The lens unit 1 and the camera body 2 are electrically connected to each other by a contact 3, and information is communicated or power is shared through the contact 3.

The lens unit 1 has an imaging optical system 101 that includes a focus lens unit, an image stabilization lens unit (lens) 102 that can move in a direction having a component in a direction orthogonal to an optical axis La of the imaging optical system 101 during image stabilization, an aperture stop (or diaphragm), and the like. The lens unit 1 includes a lens driver (second driver, lens-side driver) 103 that controls the focus lens unit, the image stabilization lens unit 102, and the diaphragm and the like. The lens unit 1 includes a lens controller (determination task, determiner) 104, a lens calculator 105, a lens memory 106, and an angular velocity sensor 107. The lens controller 104 communicates with a camera controller 203, which will be described later, via the contact 3, and controls the operation of the entire lens unit 1. The lens memory 106 stores various parameters and aberration information of the imaging optical system 101, and the like. A controller 10 includes the lens controller 104, the lens calculator 105, and the lens memory 106. The controller 10 does not have to be provided in the lens unit 1, and may be configured as a control apparatus separate from the lens unit 1.

The camera body 2 has an image sensor 201 that can move in a direction having a component in a direction orthogonal to the optical axis La during the image stabilization, and a driving/control system. The driving/control system includes an image sensor driver (first driver, camera-side driver) 202, the camera controller (determination task, determiner) 203, a camera calculator 204, and a camera memory 205. The controller 20 includes the camera controller 203, the camera calculator 204, and the camera memory 206. The controller 20 does not have to be provided in the camera body 2, and may be configured as a control apparatus separate from the camera body 2.

Although the angular velocity sensor 107 is provided in the lens unit 1 in this embodiment, it may be provided in the camera body 2 or in each of the lens unit 1 and the camera body 2.

A description will now be given of an image stabilizing method in the lens unit 1 or the camera body 2. First, the image stabilizing method in the lens unit 1 will be described. The lens memory 106 stores information on a correcting angle (lens image-stabilization sensitivity) of the image stabilization for driving the image stabilization lens unit 102 relative to a unit driving amount in a direction having a component orthogonal to the optical axis La of the image stabilization lens unit 102. The camera controller 203 acquires the angular velocity information detected by the angular velocity sensor 107 via the contact 3, and the lens image-stabilization sensitivity stored in the lens memory 106. The camera calculator 204 calculates a moving amount of the image stabilization lens unit 102 using the angular velocity information and the lens image-stabilization sensitivity. The lens driver 103 acquires the moving amount calculated by the camera calculator 204 via the lens controller 104, and moves the image stabilization lens unit 102 in the direction having the component orthogonal to the optical axis La by the acquired moving amount so as to provide the image stabilization with the lens unit 1.

Next follows a description of the image stabilizing method in the camera body 2. The lens memory 106 stores information on a correcting angle (camera image-stabilization sensitivity) of the image stabilization for driving the image sensor 201 relative to a unit driving amount in the direction having the component orthogonal to the optical axis La of the image sensor 201. The camera controller 203 acquires the angular velocity information detected by the angular velocity sensor 107 via the contact 3, and the camera image-stabilization sensitivity stored in the lens memory 106. The camera calculator 204 calculates the moving amount of the image sensor 201 using the angular velocity information and the camera image-stabilization sensitivity. The image sensor driving unit 202 can provide the image stabilization with the camera body 2 by acquiring the moving amount of the image sensor 201 calculated by the camera calculator 204, and by moving the image sensor 201 in the direction having the component orthogonal to the optical axis La by the acquired moving amount.

In this embodiment, the controller 20 calculates the moving amounts of the image stabilization lens unit 102 and the image sensor 201, but the controller 10 may do so.

If the lens unit 1 and the camera body 2 provide independent image stabilizations, the image stabilization may be excessive, or the moving amount may be too large and a problem may occur in the captured image. In this embodiment, by properly determining the ratio between the image stabilization by the lens unit 1 and the image stabilization by the camera body 2, the image stabilization effect can be maximized without causing the problem in the image.

In this embodiment, the lens memory 106 stores information (image circle information) L_IC of an imageable (or image capturable) area of the imaging optical system 101 when the image stabilization lens unit 102 is located at a reference position (optical axis position in the initial state). The image circle information is information corresponding to at least one of a zoom state and a focus state. The lens memory 106 further stores information (changing amount information) LIS_IC_henka on a changing amount of the imageable area relative to the unit correcting angle of the image stabilization driven by the image stabilization lens unit 102. The changing amount information LIS_IC_henka is information corresponding to at least one of the zoom state and the focus state. The lens memory 106 further stores information on a maximum drivable amount LIS_max of the image stabilization lens unit 102. The information on the maximum drivable amount LIS_max of the image stabilization lens unit 102 is information corresponding to at least one of the zoom state and the focus state. As described above, the lens memory 106 further stores information on a lens image-stabilization sensitivity LIS_bin, and information on a camera image-stabilization sensitivity SIS_bin. The camera image-stabilization sensitivity information SIS_bin is information corresponding to at least one of the zoom state and the focus state.

The image circle information L_IC is information on the distance from the reference position to the imageable area. Generally, the imaging optical system 101 is designed so as to capture an image in a range wider than the size of the image sensor 201. The imageable area is an area for forming an image that does not cause the problem in the image. This embodiment sets the imageable area to an area which a sufficient light amount enters by a predetermined amount or more, but may set it to an area that can sufficiently guarantee the imaging performance such as aberrations, or an area that can maintain a sufficient imaging performance when the image stabilization is executed.

Figure 2B:
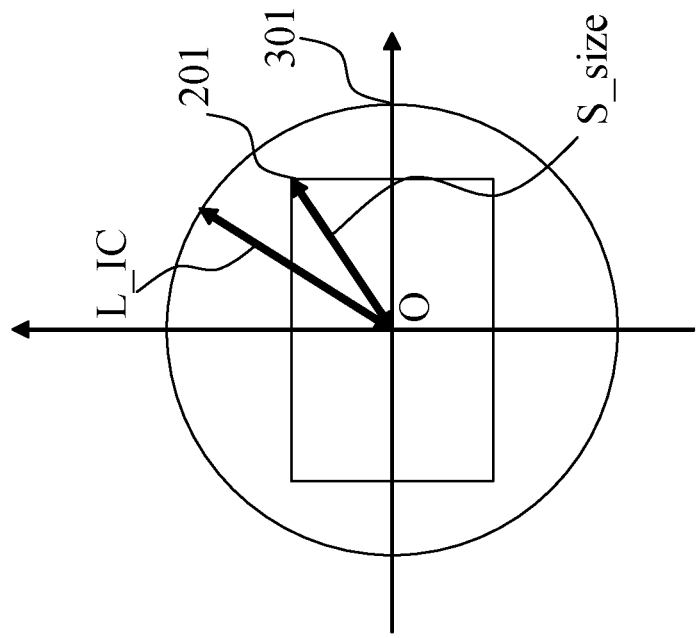
FIGS. 2A and 2B illustrate a positional relationship between an image sensor and an imageable area.
Figure 2A:
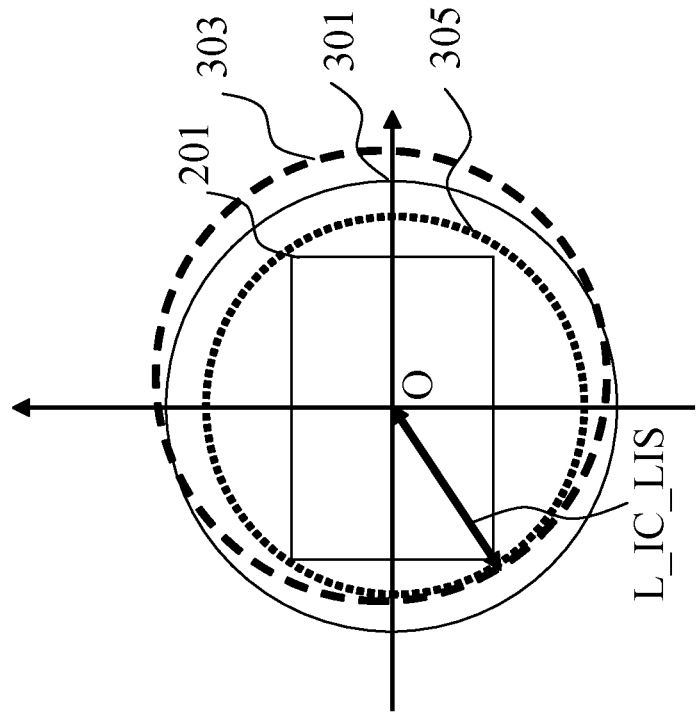

FIGS. 2A and 2B explain a positional relationship between the image sensor 201 and the imageable area. FIG. 2A illustrates a positional relationship between the image sensor 201 and an imageable area 301 when the image stabilization lens unit 102 is located at a reference position O. In this embodiment, the image circle information L_IC is distance information from the reference position O to the outermost position of the imageable area 301. When the image stabilization lens unit 102 is driven in the direction having the component orthogonal to the optical axis La during the image stabilization, the imageable area 301 changes.

FIG. 2B illustrates a positional relationship between the image sensor 201 and an imaging area 303 when the image stabilization lens unit 102 is driven by the maximum drivable amount LIS_max in the diagonal direction of the image sensor 201. In FIG. 2B, the information L_IC LIS of the imageable area 303 is the shortest distance information from the reference position O to the outermost position of the imageable area 303. The changing amount in the information in the imageable area when the image stabilization lens unit 102 is driven by the maximum drivable amount LIS_max is a difference between the image circle information L_IC and the information L_IC LIS in the imageable area 303. The correcting angle for the image stabilization when the image stabilization lens unit 102 is driven by the maximum drivable amount LIS_max is represented by the product of the lens image-stabilization sensitivity LIS_bin and the maximum drivable amount LIS_max. Thus, the changing amount information LIS_IC_henka is represented by the following expression (1).

$$\text{LIS\_IS\_henka} = \frac{L\_IC - L\_IC\_LIS}{LIS\_bin \times LIS\_max} \quad (1)$$

The camera memory 205 stores information on a maximum drivable amount SIS_max of the image sensor 201 and information on a diagonal size of the image sensor 201 (imaging range in the image sensor 201) S_size. The diagonal size S_size of the image sensor 201 is a distance from the reference position O to the diagonal position of the image sensor 201. A margin (amount) IC_yoyu in the imageable area 301 is represented by the following expression (2) using the image circle information L_IC and the diagonal size S_size of the image sensor 201.

$$IC\_yoyu = L\_IC - S\_size \quad (2)$$

As described above, when the image stabilization lens unit 102 is driven in the direction having the component orthogonal to the optical axis La for the image stabilization, the imageable area changes. Therefore, when the image stabilization lens unit 102 and the image sensor 201 are simultaneously driven for the image stabilizations, the driving range of the image sensor 201 may be limited in comparison with a case where the image stabilization lens unit 102 is not driven.

In the state of FIG. 2A, when the image sensor 201 is driven for the image stabilization, the image sensor 201 can be driven within the imageable area 301. When the image sensor 201 goes out of the imageable area 301, the acquired image becomes an image in which the light is shielded or an image in which the imaging performance such as aberrations cannot be sufficiently guaranteed.

In FIG. 2B, the imageable area 303 is an imageable area when the image stabilization lens unit 102 is driven by the maximum drivable amount LIS_max in the diagonal direction of the image sensor 201, as described above. However, the image stabilization lens unit 102 is actually driven in all directions. Therefore, the imageable area 305 based on the actual driving of the image stabilization lens unit 102 has a shape having information that connects the imageable areas when the image stabilization lens unit 102 is driven to the maximum in all directions. Therefore, when the image sensor 201 is driven for the image stabilization while the image stabilization lens unit 102 is driven to the maximum for the image stabilization, the image sensor 201 must be driven within the imageable area 305 based on actual driving of the image stabilization lens unit 102. That is, when the image stabilization lens unit 102 and the image sensor 201 are driven for the image stabilizations, the driving range of the image sensor 201 may be limited in comparison with a case where only the image sensor 201 is driven for the image stabilization.

Here, a correcting angle LIS_IC_bin for the image stabilization is expressed by the following expression (3) when the imageable area changes by a unit amount due to the driving of the image stabilization lens unit.

$$\text{LIS\_IS\_bin} = \frac{1}{LIS\_IC\_henka} \quad (3)$$

By comparing the correcting angle LIS_IC_bin and the camera image-stabilization sensitivity SIS_bin with each other and by driving the component having a larger value, the image stabilization can be efficiently made relative to a change in the imageable area.

When the correcting angle LIS_IC_bin is larger than the camera image-stabilization sensitivity SIS_bin, the image stabilization for driving the image stabilization lens unit 102 preferentially performed. The maximum value $\alpha$_Lmax of the correcting angle LIS_IC_bin is represented by the following expression (4).

$$\alpha\_L\,\text{max} = LIS\_max \times LIS\_bin \quad (4)$$

The necessary margin LIS_IC_max of the imageable area necessary to drive the image stabilization lens unit 102 to the maximum for the image stabilization is expressed by the following expression (5).

$$\text{LIS\_IC\_max} = \alpha\_L\,\text{max} \times LIS\_IC\_henka \quad (5)$$

Thus, when the image stabilization lens unit 102 is driven to the maximum while the necessary margin LIS_IC_max is larger than the margin IC_yoyu of the imageable area 301 and the image stabilization lens unit 102 is located at the reference position, the outside of the imageable area will be imaged. Therefore, the correcting angle $\alpha$_L of the image stabilization for driving the image stabilization lens unit 102 is expressed by the following expression (6).

$$\alpha\_L = IC\_yoyu \times LIS\_IC\_bin \quad (6)$$

At this time, since there is no margin left in the imageable area, the image stabilization using the image sensor 201 is not performed.

When the necessary margin LIS_IC_max is smaller than the margin IC_yoyu, the image stabilization lens unit 102 can be driven to the maximum. At this time, the correcting angle $\alpha$_L of the image stabilization for driving the image stabilization lens unit 102 is expressed by the following expression (7).

$$\alpha\_L = LIS\_max \times LIS\_bin \quad (7)$$

In this case, even if the image stabilization lens unit 102 is driven to the maximum, there is a margin in the imageable area and thus the image stabilization can be performed by driving of the image sensor 201.

The margin SIS_yoyu in the imageable area usable to drive the image sensor 201 is represented by the following expression (8).

$$SIS\_yoyu = IC\_yoyu - LIS\_IC\_max \quad (8)$$

When the margin SIS_yoyu is larger than the maximum drivable amount SIS_max of the image sensor 201, the image sensor 201 can be driven to the maximum. The correcting angle α_S of the image stabilization for driving the image sensor 201 at this time is represented by the following expression (9).

$$\alpha\_S = SIS\_max \times SIS\_bin \quad (9)$$

When the margin SIS_yoyu is smaller than the maximum drivable amount SIS_max of the image sensor 201, the image sensor 201 can be driven only by the margin SIS_yoyu. The correcting angle α_S of the image sensor 201 at this time is represented by the following expression (10).

$$\alpha\_S = SIS\_yoyu \times SIS\_bin \quad (10)$$

On the other hand, when the camera image-stabilization sensitivity SIS_bin is larger than the correcting angle LIS_IC_bin, the image stabilization for driving the image sensor 201 is preferentially performed.

When the maximum drivable amount SIS_max of the image sensor 201 is larger than the margin IC_yoyu, the maximum drivable amount of the image sensor 201 is the margin IC_yoyu. The correcting angle α_S of the image stabilization for driving the image sensor 201 at this time is represented by the following expression (11).

$$\alpha\_S = IC\_yoyu \times SIS\_bin \quad (11)$$

At this time, since there is no margin left in the imageable area, the image stabilization using the image stabilization lens unit 102 is not performed.

When the maximum drivable amount SIS_max of the image sensor 201 is smaller than the margin IC_yoyu, the image sensor 201 can be driven to the maximum. The correcting angle α_S of the image stabilization for driving the image sensor 201 at this time is represented by the following expression (12).

$$\alpha\_S = SIS\_max \times SIS\_bin \quad (12)$$

Since there is a margin in the imageable area even when the image sensor 201 is driven to the maximum, the image stabilization can be performed that drives the image stabilization lens unit 102.

The margin LIS_yoyu in the imageable area usable to drive the image stabilization lens unit 102 is expressed by the following expression (13).

$$LIS\_yoyu = IC\_yoyu - SIS\_max \quad (13)$$

At this time, the maximum value α_Lmax of the correcting angle of the image stabilization for driving the image stabilization lens unit 102 is expressed by the following expression (14).

$$\alpha\_L\ max = LIS\_max \times LIS\_bin \quad (14)$$

The necessary margin LIS_IC_max in the imageable area necessary to drive the image stabilization lens unit 102 to the maximum for the image stabilization is expressed by the following expression (15).

$$LIS\_IC\_max = \alpha\_L\ max \times LIS\_IC\_henka \quad (15)$$

Therefore, when the necessary margin LIS_IC_max is larger than the margin LIC_yoyu if the image stabilization lens unit 102 is driven to the maximum, the outside of the imageable area will be imaged. Therefore, the correcting angle α_L for driving the image stabilization lens unit 102 is represented by the following expression (16).

$$\alpha\_L = LIC\_yoyu \times LIS\_IC\_bin \quad (16)$$

When the necessary margin LIS_IC_max is smaller than the margin LIC_yoyu, the image stabilization lens unit 102 can be driven to the maximum. At this time, the correcting angle α_L of the image stabilization for driving the image stabilization lens unit 102 is expressed by the following expression (17).

$$\alpha\_L = LIS\_max \times LIS\_bin \quad (17)$$

This embodiment determines the image stabilization ratio using the ratio between the correcting angle α_S of the image stabilization for driving the image sensor 201 and the correcting angle α_L of the image stabilization for driving the image stabilization lens unit 102.

The ratio R_L of the image stabilization in the image stabilization lens unit 102 is expressed by the following expression (18).

$$R\_L = \frac{\alpha\_L}{\alpha\_L + \alpha\_S} \quad (18)$$

The ratio R_S of the image stabilization in the image sensor 201 is expressed by the following expression (19).

$$R\_S = \frac{\alpha\_S}{\alpha\_L + \alpha\_S} \quad (19)$$

Figure 3:
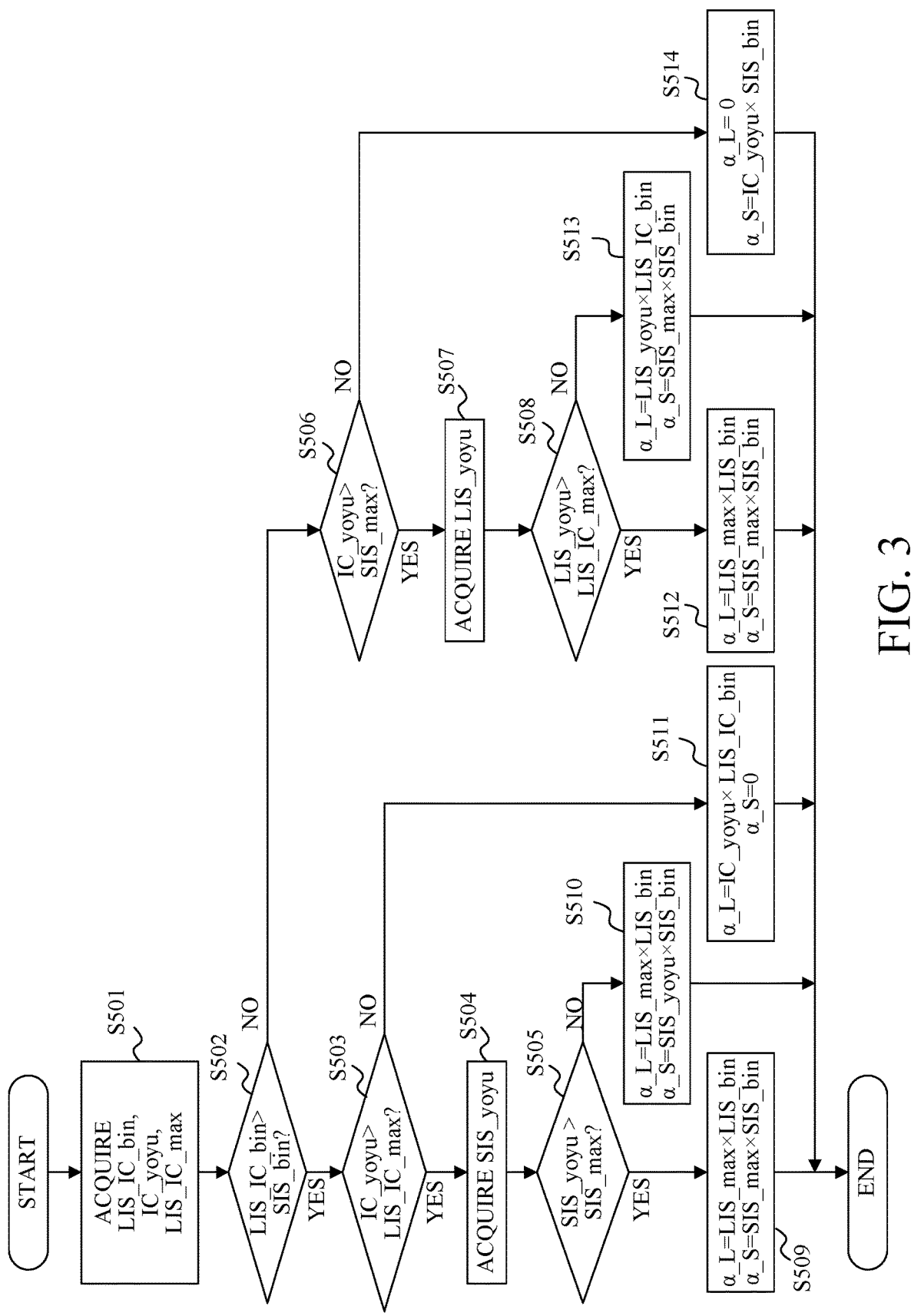
FIG. 3 is a flowchart showing a method of determining an image stabilization ratio according to a first embodiment.

Referring now to FIG. 3, a description will be given of a method of determining the image stabilization ratio in driving the image stabilization lens unit 102 and the image sensor 201. FIG. 3 is a flowchart showing a method of determining the image stabilization ratio in this embodiment. This embodiment describes the method in which the controller 20 determines the driving ratio between the image stabilization lens unit 102 and the image sensor 201, but the controller 10 may do so. This embodiment does not need to determine the image stabilization ratio so as to drive both the image stabilization lens unit 102 and the image sensor 201, and may determine the image stabilization ratio so as to drive at least one of them.

The flow starts when a shutter button (release switch) is half-pressed.

In the step S501, the camera calculator 204 first acquires the image circle information L_IC, the changing amount information LIS_IC_henka, the maximum drivable amount LIS_max of the image stabilization lens unit 102, and the camera image-stabilization sensitivity SIS_bin. Next, the camera calculator 204 calculates the margin IC_yoyu, the correcting angle LIS_IC_bin, and the necessary margin LIC_IC_max using the acquired information. The camera controller 203 acquires the information calculated by the camera calculator 204.

In the step S502, the camera controller 203 determines whether the correcting angle LIS_IC_bin is larger than the camera image-stabilization sensitivity SIS_bin. If the correcting angle LIS_IC_bin is larger than the camera image-stabilization sensitivity SIS_bin, the flow proceeds to the step S503, and if the correcting angle LIS_IC_bin is smaller than the camera image-stabilization sensitivity SIS_bin, the flow proceeds to the step S506. When the correcting angle LIS_IC_bin is equal to the camera image-stabilization sensitivity SIS_bin, which step to proceed to can be arbitrarily set.

In the step S503, the camera controller 203 determines whether or not the margin IC_yoyu is larger than the necessary margin LIC_IC_max. When the margin IC_yoyu is larger than the necessary margin LIC_IC_max, the flow proceeds to the step S504, and when the margin IC_yoyu is smaller than the necessary margin LIC_IC_max, the flow proceeds to the step S511. When the margin IC_yoyu is equal to the necessary margin LIC_IC_max, which step to proceed to can be arbitrarily set.

In the step S504, the camera calculator 204 calculates the margin SIS_yoyu of the imageable area usable to drive the image sensor 201, using the margin IC_yoyu and the necessary margin LIC_IC_max. The camera controller 203 acquires the margin SIS_yoyu calculated by the camera calculator 204.

In the step S505, the camera controller 203 determines whether or not the margin SIS_yoyu is larger than the maximum drivable amount SIS_max of the image sensor 201. When the margin SIS_yoyu is larger than the maximum drivable amount SIS_max of the image sensor 201, the flow proceeds to the step S509, and when the margin SIS_yoyu is smaller than the maximum drivable amount SIS_max of the image sensor 201, the flow proceeds to the step S510. When the margin SIS_yoyu is equal to the maximum drivable amount SIS_max of the image sensor 201, which step to proceed to can be arbitrarily set.

In the step S506, the camera controller 203 determines whether or not the margin IC_yoyu is larger than the maximum drivable amount SIS_max of the image sensor 201. When the margin IC_yoyu is larger than the maximum drivable amount SIS_max of the image sensor 201, the flow proceeds to the step S507, and when the margin IC_yoyu is smaller than the maximum drivable amount SIS_max of the image sensor 201, the flow proceeds to the step S514. When the margin IC_yoyu is equal to the maximum drivable amount SIS_max of the image sensor 201, which step to proceed to can be arbitrarily set.

In the step S507, the camera calculator 204 calculates the margin LIS_yoyu of the imageable area usable to drive the image stabilization lens unit 102, using the margin IC_yoyu and the maximum drivable amount SIS_max of the image sensor 201. The camera controller 203 acquires the margin LIS_yoyu calculated by the camera calculator 204.

In the step S508, the camera controller 203 determines whether or not the margin LIS_yoyu is larger than the necessary margin LIC_IC_max. When the margin LIS_yoyu is larger than the necessary margin LIC_IC_max, the flow proceeds to the step S512, and when the margin LIS_yoyu is smaller than the necessary margin LIC_IC_max, the flow proceeds to the step S513. When the margin LIS_yoyu is equal to the necessary margin LIC_IC_max, which step to proceed to can be arbitrarily set.

In the step S509, the camera controller 203 acquires the correcting angle $\alpha\_L$ of the image stabilization for driving the image stabilization lens unit 102 calculated with the expression (7), from the camera calculator 204. The camera controller 203 acquires the correcting angle $\alpha\_S$ of the image stabilization for driving the image sensor 201 calculated with the expression (9), from the camera calculator 204.

In the step S510, the camera controller 203 acquires the correcting angle $\alpha\_L$ of the image stabilization for driving the image stabilization lens unit 102 calculated with the expression (7), from the camera calculator 204. The camera controller 203 acquires the correcting angle $\alpha\_S$ of the image stabilization for driving the image sensor 201 calculated with the expression (10), from the camera calculator 204.

In the step S511, the camera controller 203 acquires the correcting angle $\alpha\_L$ of the image stabilization for driving the image stabilization lens unit 102 calculated with the expression (6), from the camera calculator 204. The camera controller 203 acquires the correcting angle $\alpha\_S$ of the image stabilization for driving the image sensor 201, which is 0, from the camera calculator 204. In this case, the ratio of the image stabilization for driving the image sensor 201 to the image stabilization for driving the image stabilization lens unit 102 is zero.

In the step S512, the camera controller 203 acquires the correcting angle $\alpha\_L$ of the image stabilization for driving the image stabilization lens unit 102 calculated with the expression (17), from the camera calculator 204. The camera controller 203 acquires the correcting angle $\alpha\_S$ of the image stabilization for driving the image sensor 201 calculated with the expression (12), from the camera calculator 204.

In the step S513, the camera controller 203 acquires the correcting angle $\alpha\_L$ of the image stabilization for driving the image stabilization lens unit 102 calculated with the expression (16), from the camera calculator 204. The camera controller 203 acquires the correcting angle $\alpha\_S$ of the image stabilization for driving the image sensor 201 calculated with the expression (12), from the camera calculator 204.

In the step S514, the camera controller 203 acquires the correcting angle $\alpha\_L$ of the image stabilization for driving the image stabilization lens unit 102, which is zero, from the camera calculator 204. The camera controller 203 acquires the correcting angle $\alpha\_S$ of the image stabilization for driving the image sensor 201 calculated with the expression (11), from the camera calculator 204. In this case, the ratio of the image stabilization for driving the image sensor group 102 to the image stabilization for driving the image sensor 201 is zero.

As described, the configuration according to this embodiment can maximize the image stabilization effect without causing any problems in the image.

Second Embodiment

This embodiment performs the image stabilization for driving the image stabilization lens unit 102 within a predetermined image stabilization angle before image capturing, and during actually image capturing, the image stabilizations for driving the image stabilization lens unit 102 and the image sensor 201 are performed.

Since this embodiment performs the image stabilization for driving the image stabilization lens unit 102 before image capturing, the camera memory 205 stores the correcting angle of the image stabilization for driving the image stabilization lens unit 102 in addition to the information described in the first embodiment, when the shutter button is half-pressed.

Figure 4:
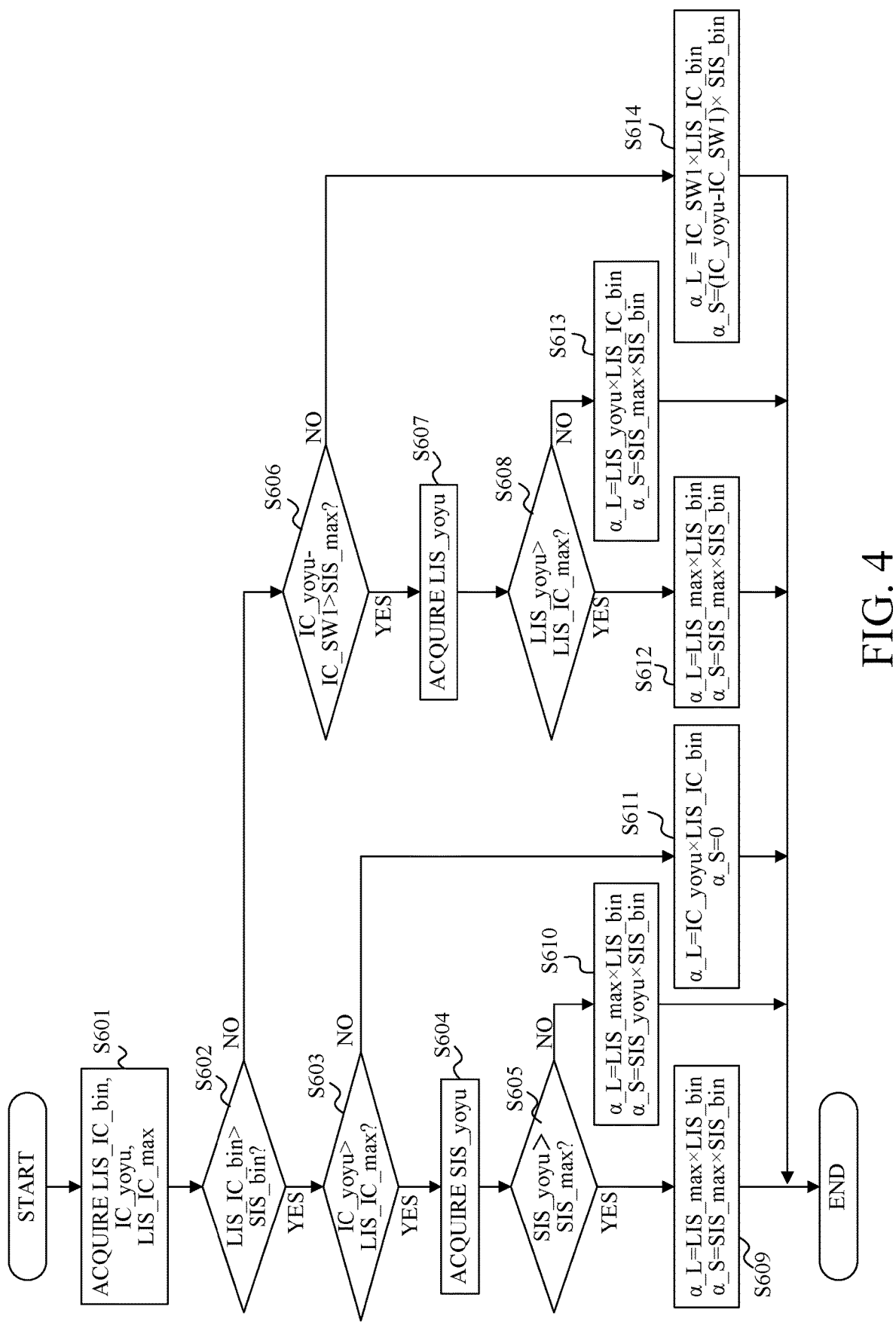
FIG. 4 is a flowchart showing a method of determining an image stabilization ratio according to a second embodiment.

Referring now to FIG. 4, a description will be given of a method of determining a ratio between the image stabilization for driving the image stabilization lens unit 102 and the image stabilization for driving the image sensor 201. FIG. 4 is a flowchart showing a method of determining the image stabilization ratio according to this embodiment. This embodiment will describe the method in which the controller 20 determines the driving ratio between the image stabilization lens unit 102 and the image sensor 201, but the controller 10 may determine the driving ratio. This embodiment does not need to determine the image stabilization ratio so as to drive both the image stabilization lens unit 102 and the image sensor 201, and may determine the image stabilization ratio so as to drive at least one of them.

Since processing of the steps S601 to S605 and steps S609 to S611 is the same as processing of the steps S501 to S505 and steps S509 to S511 in FIG. 3, a detailed description thereof will be omitted.

In this embodiment, since the image stabilization for driving the image stabilization lens unit 102 is performed when the shutter button is half-pressed, the driving amount in the image stabilization for driving the image sensor 201 during image capturing may be smaller than that in the first embodiment. The changing amount IC_SW1 in the imageable area when the shutter button is half-pressed is represented by the following expression (20).

$$IC\_SW1 = LIS\_IC\_henka \times \alpha\_SW1 \qquad (20)$$

In the step S606, the camera controller 203 determines whether or not the value obtained by subtracting the changing amount IC_SW1 of the imageable area when the shutter button is half-pressed from the margin IC_yoyu is larger than the maximum drivable amount SIS_max of the image sensor 201. When the value obtained by subtracting the changing amount IC_SW1 of the imageable area when the shutter button is half-pressed from the margin IC_yoyu is larger than the maximum drivable amount SIS_max of the image sensor 201, the flow proceeds to the step S607. When the value obtained by subtracting the changing amount IC_SW1 of the imageable area when the shutter button is half-pressed from the margin IC_yoyu is smaller than the maximum drivable amount SIS_max of the image sensor 201, the flow proceeds to the step S614. When the value obtained by subtracting the changing amount IC_SW1 of the imageable area when the shutter button is half-pressed from the margin IC_yoyu is equal to the maximum drivable amount SIS_max of the image sensor 201, which step to proceed to can be arbitrarily set.

Since processing of the steps S607, S608, S612, and S613 is the same as processing of the steps S507, S508, S512, and S513 in FIG. 3, a detailed description thereof will be omitted.

In the step S614, the camera controller 203 acquires the correcting angle α_L of the image stabilization for driving the image stabilization lens unit 102 calculated with the following expression (21), from the camera calculator 204. The camera controller 203 acquires the correcting angle α_S of the image stabilization for driving the image sensor 201, which is calculated with the following expression (22), from the camera calculator 204.

$$\alpha\_L = IC\_SW1 \times LIS\_IC\_bin \qquad (21)$$

$$\alpha\_S = (IC\_yoyu - IC\_SW1) \times SIS\_bin \qquad (22)$$

Each of the above embodiments can provide a control apparatus, a lens apparatus, an image pickup apparatus, and an image pickup system, each of which can properly perform an image stabilization and obtain a good image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-227871, filed on Dec. 18, 2019 which is hereby incorporated by reference herein in its entirety.

What is claimed is:

1. A control apparatus configured to control at least one of a first driver that drives an image sensor for a first image stabilization and a second driver that drives a lens for a second image stabilization, the control apparatus comprising:
at least one processor or circuit configured to execute a plurality of tasks including a determination task configured to determine a ratio between the first image stabilization by the first driver and the second image stabilization by the second driver, using information on a changing amount of an imageable area of an optical system including the lens relative to a unit correcting angle of the second image stabilization, and information on a correcting angle of the first image stabilization relative to a unit driving amount of the image sensor.

2. The control apparatus according to claim 1, wherein the determination task determines the ratio using information on the imageable area when the lens is located at a reference position, information on an imaging range of the image sensor, information on a maximum drivable amount of the lens, and information on a correcting angle of the second image stabilization relative to the unit driving amount of the lens.

3. The control apparatus according to claim 2, wherein the information on the maximum drivable amount of the lens is information corresponding to at least one of a zoom state and a focus state of the optical system.

4. The control apparatus according to claim 1, wherein the determination task determines the ratio using information on the imageable area when the lens is located at a reference position, information on an imaging area of the image sensor, and information on a maximum drivable amount of the image sensor.

5. The control apparatus according to claim 1, wherein the determination task determines the ratio using information on the imageable area when the lens is located at a reference position, information on an imaging area in the image sensor, information on a maximum drivable amount of the lens, information on a correcting angle of the second image stabilization relative to a unit driving amount of the lens, and information on a maximum drivable amount of the image sensor.

6. The control apparatus according to claim 2, wherein the information on the imageable area when the lens is located at the reference position is information corresponding to at least one of a zoom state and a focus state of the optical system.

7. The control apparatus according to claim 1, wherein the information on the changing amount of the imageable area relative to the unit correcting angle of the second image stabilization is information corresponding to at least one of a zoom state and a focus state of the optical system.

8. The control apparatus according to claim 1, wherein the information on the correcting angle of the first image stabilization relative to the unit driving amount of the image sensor is information corresponding to at least one of a zoom state and a focus state of the optical system.

9. A lens apparatus attachable to and detachable from an image pickup apparatus that includes a camera-side driver configured to drive an image sensor for an image stabilization, the lens apparatus comprising:
an optical system including a lens;

a lens-side driver configured to drive the lens for an image stabilization; and at least one processor or circuit configured to execute a plurality of tasks including a determination task configured to determine a ratio between the image stabilization by the lens-side driver and the image stabilization by the camera-side driver, using information on a changing amount of an imageable area of the optical system relative to a unit correcting angle of the image stabilization using the lens, and information on a correcting angle of the image stabilization using the image sensor relative to a unit driving amount of the image sensor.

10. An image pickup apparatus attachable to and detachable from a lens apparatus that includes a lens-side driver configured to drive a lens for an image stabilization, the image pickup apparatus comprising:

a camera-side driver configured to drive an image sensor for an image stabilization; and at least one processor or circuit configured to execute a plurality of tasks including a determination task configured to determine a ratio between the image stabilization by the lens-side driver and the image stabilization by the camera-side driver, using information on a changing amount of an imageable area of an optical system including the lens, relative to a unit correcting angle of the image stabilization using the lens, and information on a correcting angle of the image stabilization using the image sensor relative to a unit driving amount of the image sensor.

11. An image pickup system comprising:

a lens apparatus according to claim 9; and an image pickup apparatus attachable to and detachable from a lens apparatus that includes a lens-side driver configured to drive a lens for an image stabilization, wherein the image pickup apparatus includes:

a camera-side driver configured to drive an image sensor for an image stabilization; and at least one processor or circuit configured to execute a plurality of tasks including a determination task configured to determine a ratio between the image stabilization by the lens-side driver and the image stabilization by the camera-side driver, using information on a changing amount of an imageable area of an optical system including the lens, relative to a unit correcting angle of the image stabilization using the lens, and information on a correcting angle of the image stabilization using the image sensor relative to a unit driving amount of the image sensor.

* * * * *